United States Patent
Sood et al.

(10) Patent No.: US 11,785,030 B2
(45) Date of Patent: Oct. 10, 2023

(54) IDENTIFYING DATA PROCESSING TIMEOUTS IN LIVE RISK ANALYSIS SYSTEMS

(71) Applicant: PAYPAL, INC., San Jose, CA (US)

(72) Inventors: Vishal Sood, Bangalore (IN); Divakar Viswanathan, Tiruchirappalli (IN); Sheena Chawla, Bangalore (IN); Sudhindra Murthy, Bangalore (IN); Vidya Sagar Durga, Bangalore (IN); Hong Fan, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 325 days.

(21) Appl. No.: 17/008,323

(22) Filed: Aug. 31, 2020

(65) Prior Publication Data
US 2021/0400066 A1 Dec. 23, 2021

(30) Foreign Application Priority Data

Jun. 19, 2020 (IN) .............................. 202041025894

(51) Int. Cl.
H04L 29/06 (2006.01)
H04L 9/40 (2022.01)
G06N 20/00 (2019.01)

(52) U.S. Cl.
CPC ......... H04L 63/1425 (2013.01); G06N 20/00 (2019.01)

(58) Field of Classification Search
CPC .. H04L 63/1425; H04L 63/1433; G06N 20/00
See application file for complete search history.

(56) References Cited

U.S. PATENT DOCUMENTS

| | | | |
|---|---|---|---|
| 8,839,222 B1* | 9/2014 | Brandwine | G06F 8/65 717/168 |
| 10,686,811 B1* | 6/2020 | Ehle | G06N 20/00 |
| 2016/0173516 A1* | 6/2016 | Raugas | G06N 7/005 726/23 |
| 2016/0269908 A1* | 9/2016 | Richards | G06Q 20/08 |
| 2016/0300156 A1* | 10/2016 | Bowers | G06F 16/2465 |
| 2017/0171044 A1* | 6/2017 | Das | H04L 69/329 |
| 2017/0244743 A1* | 8/2017 | Key | H04L 63/02 |
| 2021/0320943 A1* | 10/2021 | St. Pierre | H04L 63/20 |
| 2022/0060491 A1* | 2/2022 | Achleitner | H04L 63/1416 |

* cited by examiner

*Primary Examiner* — Ka Shan Choy
(74) *Attorney, Agent, or Firm* — Haynes and Boone, LLP (57) ABSTRACT

This application discusses identifying data processing timeouts in live risk analysis systems. A service provider, such as an electronic transaction processor, may provide a production computing environment that includes a risk analysis system having one or more risk models, which may be machine-learning based. These risk models may be utilized in order to determine whether incoming data processing requests are fraudulent. To test these risk models using production data traffic, an audit computing environment made of a set of machines that do not service production computing environment requests, but that utilize databases and data connections as are used by the production systems. The audit computing environment may thus mirror the risk models and functionality of the production computing environment without the drawbacks of a typical fully separate testing environment. Thus, risk model performance and execution times may be monitored to determine whether any models encounter errors with production data traffic.

20 Claims, 6 Drawing Sheets

IDENTIFYING DATA PROCESSING TIMEOUTS IN LIVE RISK ANALYSIS SYSTEMS

CROSS REFERENCE

This application claims priority to Indian Provisional Application No. 202041025894, filed Jun. 19, 2020, which is hereby incorporated by reference in its entirety.

TECHNICAL FIELD

The present application generally relates to artificial intelligence (AI) models and more particularly to testing and identifying timeouts with AI models in live risk analysis systems based on processing incoming transactions, according to various embodiments.

BACKGROUND

Artificial intelligence (AI) systems enable machines to learn from experience, adjust to new data or inputs, and provide more accurate predictions or results. As AI systems continue to improve, so do their uses, including with online service providers. Online service providers may provide services including electronic transaction processing to different users, such as individual end users, merchants, companies, and other entities. When performing these services, service providers may utilize risk analysis systems to determine whether certain actions should be performed, such as account login and authentication, electronic payment processing, or other data processing transactions. However, as hackers and other malicious users or entities become more sophisticated, they may perform different and new computing attacks. Service providers may attempt to identify such computing attacks and data processing transactions in order to prevent or mitigate against such attacks, but even using AI systems and their corresponding data processing models, attackers are constantly trying new techniques to attempt to circumvent computer and account security policies. Debugging AI systems including models used by the AI system is one way to try and identify errors, but debugging different data processing models in an AI system may be time consuming and resource intensive for service provider computing environments. Applicant thus recognizes that computer system security can be improved by techniques that would help prevent and mitigate new methods of attack that have not yet been fully identified and classified.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for identifying data processing timeouts in live risk analysis systems according to various embodiments. Systems suitable for practicing methods of the present disclosure are also provided.

In service provider systems, such as online platforms and systems that allow users to interact with, use, and request data processing transactions, provider computing architectures may face different types of computing attacks and fraudulent data processing coming from malicious sources over a network. For example, a bad actor may request data processing that attempts to circumvent a computer security and/or risk analysis system. Other computing devices may perform computing attacks that attempt to exploit vulnerabilities in computing devices, servers, and/or networks, such as an HTTP smuggling request, denial-of-service (DoS) and distributed denial-of-service (DDoS) attacks, a fraudulent transaction processing request, a password or eavesdropping attack, a session hijacking or Man-in-the-middle (MitM) attack, or other type of computing attack. This may include attempting to exploit machine learning (ML), neural network (NN), or other AI models that are used for service provider systems to make decisions.

Thus, these fraudulent or malicious data processing requests may impact computer system security by introducing unauthorized access (e.g. risk and fraud) in the services, automated systems, and intelligent models provided by the service provider to process data transactions. These data transactions may correspond to computing events and requests, including authentication and login, electronic transaction processing, account creation and/or updating (including password recovery or reset requests), and the like. In order to test intelligent systems that provide decision-making for the service provider, the service provider may utilize an audit computing pool and analysis of decision-making model execution times to test the models to determine whether the models are behaving differently with different data processing transactions from a production computing environment. Importantly, this audit pool may utilize production data connections and database resources in order to appropriately mirror production conditions during testing and investigation, according to various embodiments, which allows better performance analysis particularly in environments with tight time conditions (e.g. where an action may have to be taken within a short time such as a few hundred milliseconds).

For example, an updated version or new decision-making model may be tested for implementation in a production computing environment to provide intelligent and automated decision-making. However, the model may first be tested in the audit computing environment to determine whether it is behaving correctly, e.g., producing results within an acceptable threshold of accuracy. Additionally, data processing transactions that are causing data processing and execution timeouts and errors in decision-making systems and models may be analyzed in the audit computing environment to determine which models may be causing the timeouts. Further, a variation, such as a standard deviation, in execution times for decision-making systems and models may be determined so that a decision-making model that exceeds that variation during runtime conditions in the production environment may be identified in order to debug any errors that may lead to exploitation loopholes in the decision-making systems.

In this regard, a service provider, which may provide services to users including electronic transaction processing such as online transaction processors (e.g., PayPal®), may allow merchants, users, and other entities to process transactions, provide payments, and/or transfer funds between these users. The user may also interact with the service provider to establish an account and provide other information for the user. Other service providers may also provide computing services, including social networking, microblogging, media sharing, messaging, business and consumer platforms, etc. In order to utilize the computing services of a service provider, the service provider may provide a computing architecture and environment where the users may access and utilize operations provided by the service provider. These systems may include intelligent and/or automated decision-making processes, such as AI systems that implement different machine learning (ML) trained for performing actions, making decisions, and/or providing a service to users. In certain embodiments, such as an online transaction processor, this may include risk analysis systems that perform risk analysis and/or score data processing transactions based on risk models. However, bad actors may attempt to exploit these AI systems and models in order to perform a malicious computing attack and process fraudulent data through the service provider or causing the AI system to timeout and encounter errors.

To address this, in an embodiment, the service provider may implement different computing environments and pools or collections of machines in these computing environments to test and process live production data with different risk models and other decision-making operations. For example, a production or live computing environment may correspond to a computing environment that processes live production data from data processing transactions requested by users (e.g., consumers, merchants, and other entities) of the service provider. This environment may therefore make real-time or live decisions based on decision-making models that run in the production environment, such as to provide the services offered by the service provider. In an exemplary embodiment, the production environment may include risk analysis systems and models to determine risk associated with certain data processing transactions, such as login and authentication, electronic transaction processing requests, account setup, and the like.

In this environment, live production data may therefore correspond to the data provided by users of the service provider for risk analysis, such as the user's personal and/or financial data, device data and identifiers, and data that may be entered to one or more forms, interfaces, and data processing operations. However, this live production data may cause errors in decision-making systems, such as execution timeouts where the risk analysis system encounters an error that prevents the risk analysis system from completing a risk analysis in a maximum allowed timeframe. Timeouts may occur when a risk model is prevented from determining a risk score, making a risk decision, or otherwise performing a classification based on the production data within a certain time period. This may therefore prevent a proper risk analysis, which may lead to vulnerabilities and exploitations by malicious actors.

The service provider may therefore provide an audit pool of computing devices in a separate audit computing environment where the service provider may test risk models and other decision-making operations using live production data. The audit computing environment may therefore correspond to a set of machines or devices in a separate special-purpose environment within the production system that serves production traffic. Thus, the audit computing environment is not offline and production data stored to large production databases can be loaded to the audit computing environment. Instead, the audit computing environment may also receive and service the same live production data using existing production (live) databases and data channels, however, may not participate in the adjudication operations performed by the production computing environment, such as those decisions and operations implemented based on a risk analysis determination. The audit computing environment may mimic a production computing environment in processing traffic, such as by having the same or similar decision-making systems and models and utilising the same data sources. Thus, the audit computing environment may include the risk models, including new or test versions of such models, from the production computing environment. Testing outside of the production environment (e.g. using non-production data sources) can be particularly problematic when timing requirements are strict—a rule and/or revised machine learning model under test in such an environment cannot necessarily be reliably judged to see if it conforms with service level agreements (e.g. to return 99.99% of queries within 500 ms, or some other threshold).

The audit computing environment may therefore process the production traffic and data in order to provide an output and evaluation data that may be used by developers and testers to ensure the validity and proper decision-making by the models in the production data environment. In this regard, the audit computing environment may include a flow mechanism to regulate data traffic based on the needs and requirements for testing a particular model. The mechanism may therefore assist in providing production data and traffic to the risk models to allow for training and auditing of models for a particular risk product and system. As production data is processed by the service provider, the data processing transactions in the production data may be assigned a join key or other unique identifier that identifies the particular data processing transaction to the service provider in both the production computing environment and the audit computing environment. Production data that is identified in such a manner may then be controlled as traffic to the audit pool based on the origin of the traffic (e.g., a particular domain), amount of data processing transactions per timeframe (e.g., every minute) for processing, and the like. Further, models in the audit computing environment, such as new or test versions of a risk model, may also be promoted to the production computing environment when approved for production usage.

Using the audit computing environment, a risk model may be tested to determine the behavior of the risk model using production data. For example, a developer or data scientist may provide a new or updated risk model (e.g., a new version) in the audit computing environment. The new risk model in the audit computing environment may then be tested using one or more data processing transactions from the production data, such as by processing the data processing transaction(s) using the new risk model. This may generate a risk score, analysis, or decision based on the data processing transaction(s). In this regard, the risk score may correspond to a likelihood of risk or fraud present in the data processing transaction(s) or would result from the data processing transaction(s).

Using the join key(s) for the data processing transaction(s) that uniquely identify that data to the service provider, the resulting risk score or analysis may be compared to the risk score or analysis performed by the same or similar risk model in the production computing environment. Thereafter, the developer or data scientist may determine the performance of the new risk model in the audit computing environment as compared to the risk model in the production computing environment that is performing the same or similar risk task and determine whether to promote the new risk model to the production computing environment. Additionally, the audit computing environment may provide a transaction processing log for the data processing transactions and corresponding risk analysis performed by the risk model in the audit computing environment. This log may further include the join keys and results from different risk models for comparison.

Further, using the audit computing environment, the service provider may also replay data processing transactions that caused a timeout and error in the production data environment. The audit computing environment may receive a designation of one or more data processing transactions to test one or more risk models in the audit computing environment. The audit computing environment may designate one or more risk models to test with the data processing transaction(s), which may correspond to the risk model(s) from the production computing environment. The risk model(s) may then be executed to process the data processing transaction(s) to determine an execution time of the risk model(s). Using the join key(s) and/or other execution times that caused timeouts in the production computing environment, the execution times for the risk model(s) tested in the audit computing environment may be analyzed to determine if a risk model is causing a timeout in the production computing environment. For example, if a risk model takes 300 milliseconds (ms) to process the data processing transaction(s), and a risk analysis system in the production computing environment is taking the same or similar amount of time to process the data processing transaction(s), the risk model may be the model causing the timeout. Similarly, if the risk model is exceeding a maximum execution time set of a timeout in the production computing environment, that risk model may also be causing the timeout.

Additionally, the execution times for different risk models and/or the risk analysis system may be used to identify and flag risk models that may be exceeding certain processing times and therefore encountering errors or causing system processing timeouts. For example, a variation, such as a standard deviation, in execution times of the models and/or system when processing production data traffic may be determined. The variation may then be implemented on the risk models so that if a risk model exceeds this variation when processing one or more data processing transactions, the risk model and/or the data processing transaction(s) causing that increased execution time may be identified and flagged. Thereafter, a developer or data scientist may analyze the risk model for errors and debugging, as well as the data processing transactions for fraud and malicious behavior. Additionally, the service provider may also implement a rule where if the risk model exceeds the variation, the risk model may be extracted or taken out of the risk analysis operation or system when processing one or more data processing transactions so that the risk model does not cause a timeout of the risk analysis system and a processing error.

Figure 1:
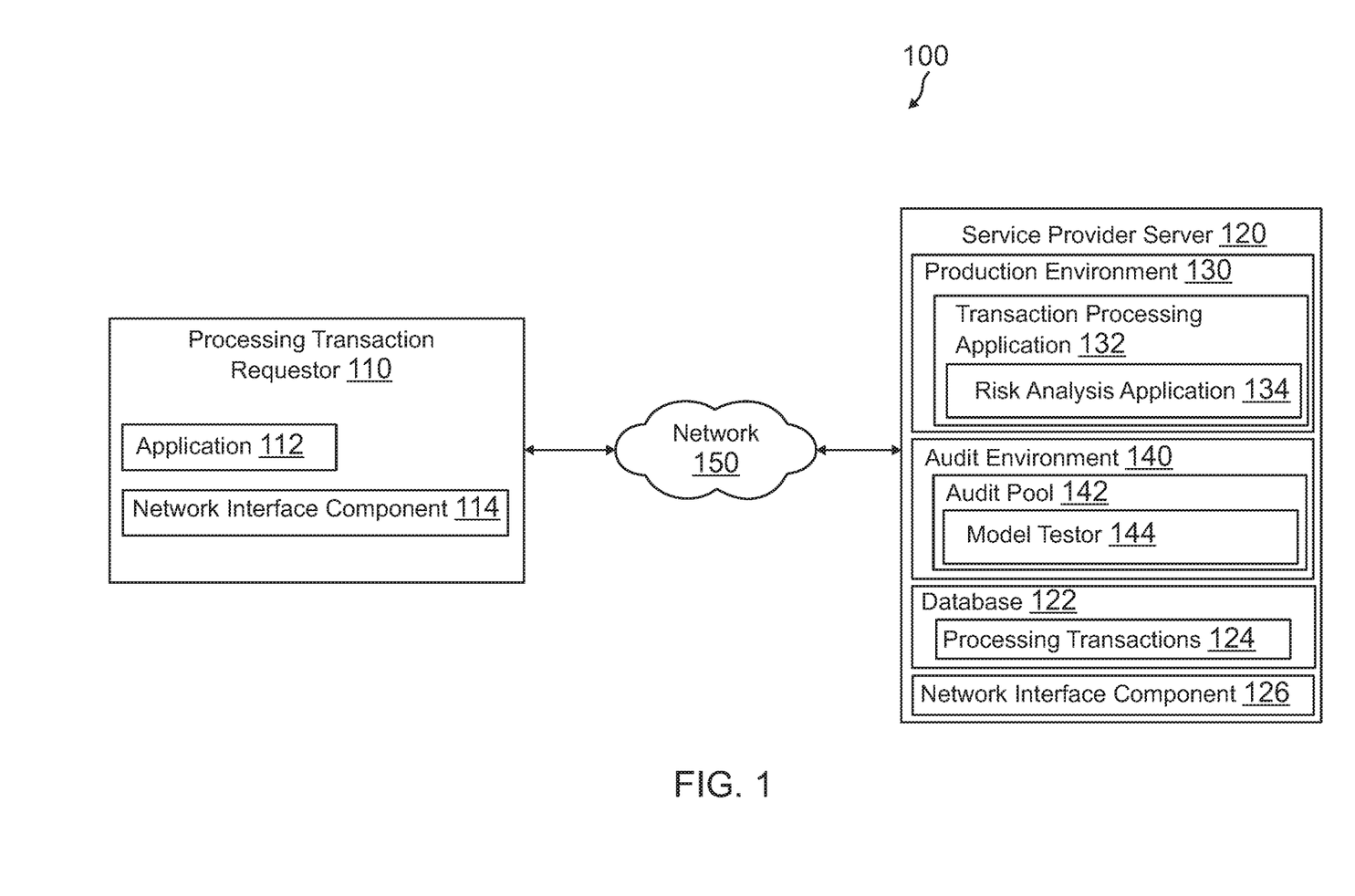
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a data processing requestor 110 and a service provider server 120 in communication over a network 150. Data processing requestor 110 may be utilized by a standard user (e.g., consumer, merchant, or other entity) or a bad actor to perform computing operations with service provider server 120 over network 150, where service provider server 120 may provide various data, operations, and other functions to data processing requestor 110. In this regard, data processing requestor 110 may request processing of data during a data processing transaction, which may be analyzed for intelligent decision-making by the ML, NN, and other AI systems of service provider server 120. Service provider server 120 may provide intelligent models, such as risk analysis models, to determine whether to process the data and/or take an action with respect to the data. However, processing timeouts may occur and testing of the risk models may be desirable and provided through an audit computing environment of a set of machines for service provider server 120.

Data processing requestor 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Data processing requestor 110 may be implemented as a communication device that may utilize appropriate hardware and software configured for wired and/or wireless communication with service provider server 120. For example, in one embodiment, data processing requestor 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. Although only one device is shown, a plurality of devices may function similarly and/or be connected to provide the functionalities described herein.

Data processing requestor 110 of FIG. 1 contains an application 112 and a network interface component 114. Application 112 may correspond to executable processes, procedures, and/or applications with associated hardware. In other embodiments, data processing requestor 110 may include additional or different modules having specialized hardware and/or software as required.

Application 112 may correspond to one or more processes to execute software modules and associated components of data processing requestor 110 to provide features, services, and other operations for a user over network 150, which may include accessing and/or interacting with service provider server 120. In this regard, application 112 may correspond to specialized software utilized by a user of data processing requestor 110 that may be used to access a website or UI provided by service provider server 120 to perform actions or operations. In various embodiments, application 112 may correspond to a general browser application configured to retrieve, present, and communicate information over the Internet (e.g., utilize resources on the World Wide Web) or a private network. For example, application 112 may provide a web browser, which may send and receive information over network 150, including retrieving website information (e.g., a website for service provider server 120 and/or a merchant), presenting the website information to the user, and/or communicating information to the website. However, in other embodiments, application 112 may include a dedicated application provided by service provider server 120 or other entity (e.g., a merchant). Application 112 may be associated with account information, user financial information, and/or transaction histories. In further embodiments, different services may be provided via application 112, including messaging, social networking, media posting or sharing, microblogging, data browsing and searching, online shopping, and other services available through service provider server 120. Thus, application 112 may also correspond to different types of service applications, service providers, and the like.

However, when using application 112, a user may request data processing of data that causes errors and timeouts with system processing using decision-making models and systems of service provider server 120. In some embodiments, these may correspond to proper data processing transactions for valid data, but may be unfamiliar or unable to be processed using the decision-making models and systems. In other embodiments, a bad actor may perform some operation to compromise service provider server 120 and/or conduct fraud, such as by fraudulent data that causes improper decisions and/or timeouts. For example, the bad actor may request fraudulent electronic transaction processing, or otherwise perform an illegal action or conduct that is barred by the rules and regulations of service provider server. Thus, application 112 may provide data over network 150 to service provider server 120, which may be processed in one or more data processing transactions and may be evaluated by the risk and other decision-making models in a production and/or audit computing environment.

Data processing requestor 110 includes at least one network interface component 114 adapted to communicate with service provider server 120. In various embodiments, network interface component 114 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Service provider server 120 may be maintained, for example, by an online service provider, which may provide data processing operations for data provided by data processing requestor 110. In this regard, service provider server 120 includes one or more processing applications which may be configured to interact with data processing requestor 110 to process data, as well as different computing environments that may be used to test decision-making models (e.g., risk models) and determine errors in the models for debugging and further development. In one example, service provider server 120 may be provided by PAYPAL®, Inc. of San Jose, Calif., USA. However, in other embodiments, service provider server 120 may be maintained by or include another type of service provider.

Service provider server 120 of FIG. 1 includes a production environment 130, an audit environment 140, a database 122, and a network interface component 126. Production environment 130 may include a transaction processing application 132 and a risk analysis application 134, while audit environment 140 may include a model tester 144 executed by an audit pool 142. Transaction processing application 132, risk analysis application 134, and model tester 144 may correspond to executable processes, procedures, and/or applications with associated hardware. In other embodiments, service provider server 120 may include additional or different modules having specialized hardware and/or software as required.

Production environment 130 may correspond to a production computing environment of service provider server 120 that is hosted and provided by one or more machines, devices, and/or servers to implement the production services and computing products of service provider server 120. In this regard, production environment 130 may correspond to a computing environment and/or setting where software services and other products are implemented and provided for their intended uses by end users of service provider server 120, such as an end user of data processing requestor 110. This may include operations to provide the services of service provider server 120, such as electronic transaction processing, messaging, social networking, media posting or sharing, microblogging, data browsing and searching, online shopping, and other services. Thus, production environment 130 may process live production data from data provided in data processing transactions from end users, which may also be utilized in audit environment 140 and stored in database 122 as processing transactions 124.

In some embodiments, production environment 130 provides transaction processing application 132 as the product of service provider server 120 that may be utilized by end users, such as to perform electronic payments, transfers, and the like using one or more accounts and/or financial instruments. Transaction processing application 132 may correspond to one or more processes to execute modules and associated specialized hardware of service provider server 120 to process a transaction, which may further include risk analysis for authorization and performance of certain actions by risk analysis application 134. In this regard, transaction processing application 132 may correspond to specialized hardware and/or software used by a user associated with data processing requestor 110 to establish a payment account and/or digital wallet, which may be used to generate and provide user data for the user, as well as process transactions, based on risk analysis occurring from risk models of risk analysis application 134. Transaction processing application 132 may also include or utilize different processors, engines, or models as required for processing different data and operations requested by data processing requestor 110, such as login an authentication, account setup and maintenance, electronic transaction processing, deposit and/or withdrawal, dispute resolution, and the like.

In various embodiments, financial information may be stored to the account, such as account/card numbers, financial instruments and balances, and/or another financial information. A digital token for the account/wallet may be used to send and process payments, for example, through an interface provided by service provider server 120. In some embodiments, the financial information may also be used to establish a payment account. The payment account may be accessed and/or used through a browser application and/or dedicated payment application executed by data processing requestor 110 and engage in transaction processing through transaction processing application 132. Transaction processing application 132 may process the payment and may provide a transaction history to data processing requestor 110 for transaction authorization, approval, or denial. Additionally, during these steps, data may be sent, received, and processed by transaction processing application 132, for example, in one or more data processing transactions. Risk analysis application 134 may include one or more risk models utilized to determine risk scores, variable calculations in risk analysis, and other risk assessments. Risk analysis application 134 may therefore include on or more risk models that may be tested and examined using audit environment 140. Additionally, risk analysis application 134 may implement on or more variations of execution times of risk models in order to flag bad or erroneous data processing transactions and/or risk models.

Audit environment 140 may correspond to a computing environment of service provider server 120 that is hosted and provided by one or more machines, devices, and/or servers to implement the auditing services of production or live risk models and other decision-making models of service provider server 120. In this regard, audit environment 140 may correspond to a computing environment and/or setting provided by audit pool 142 of machines that allow for testing and auditing of software services and other products that may be implemented in production environment 130 for their intended purposes to end users of service provider server 120. Audit environment 140 therefore corresponds to a separate computing environment using live production data, such as a mirror of production environment 130 that is separate from production environment 130 and performs data processing but does not participate in the adjudication of data (e.g., providing some result or completing some operation based on the data). Audit environment 140 may include operations to provide a model tester 144 that allows for testing of risk models and other systems and AI models.

For example, audit pool 142 may correspond to a separate set of machines in an environment that processes the live production data later stored to large and/or enterprise data systems, such as processing transaction 124 in database 122. Audit environment 140 therefore is not an offline environment that loads processing transactions 124 but instead includes operations to process real-time or live data from production environment 130. Audit pool 142 may include a remote configuration and/or request replay service that may allow for scheduling of jobs, controlling flow of production data from different software products, and dispatching of data from processing. Model tester 144 may interact with one or more risk models or other AI/decision-making models that may mirror those in production environment 130 and/or promoted for use in production environment 130. Thus, the risk models may correspond to production models, new or test versions of models, and/or the like.

Model tester 144 may therefore process the production traffic and data provided by the remote configuration and/or request replay services and operations using the test model(s) in audit environment 140. Model tester 144 may provide output and evaluation data for analysis regarding the performance of the risk models. Production data provided to model tester 144, such as data processing transactions in the production data, may be identified using a join key or other unique identifier that allows for identification of the data processing transactions across different production environments and applications of service provider server 120. Model tester 144 may also be in communication with one or more databases in order to store model testing results and other data for analysis, such as in one or more testing logs and/or histories.

Additionally, service provider server 120 includes database 122. Database 122 may store various identifiers associated with data processing requestor 110, service provider server 120, and/or another entity. Database 122 may also store account data, including payment instruments and authentication credentials, as well as transaction processing histories and data for processed transactions. Database 122 may store financial information or other data generated and stored by different applications and operations of service provider server 120. This may include data from one or more operations provided by applications within production environment 130 and/or audit environment 140, such as processing transactions 124 from production data traffic. Database 122 may also store results from model testing within audit environment 140, as well as other data necessary for model testing including test or new models. Furthermore, database 122 may also store information associated with execution times, such as maximum execution time of a risk system and/or model before timeout, variations or standard deviations in model execution times, and/or timeout errors caused by execution times.

In various embodiments, service provider server 120 includes at least one network interface component 126 adapted to communicate with data processing requestor 110 over network 150. In various embodiments, network interface component 126 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
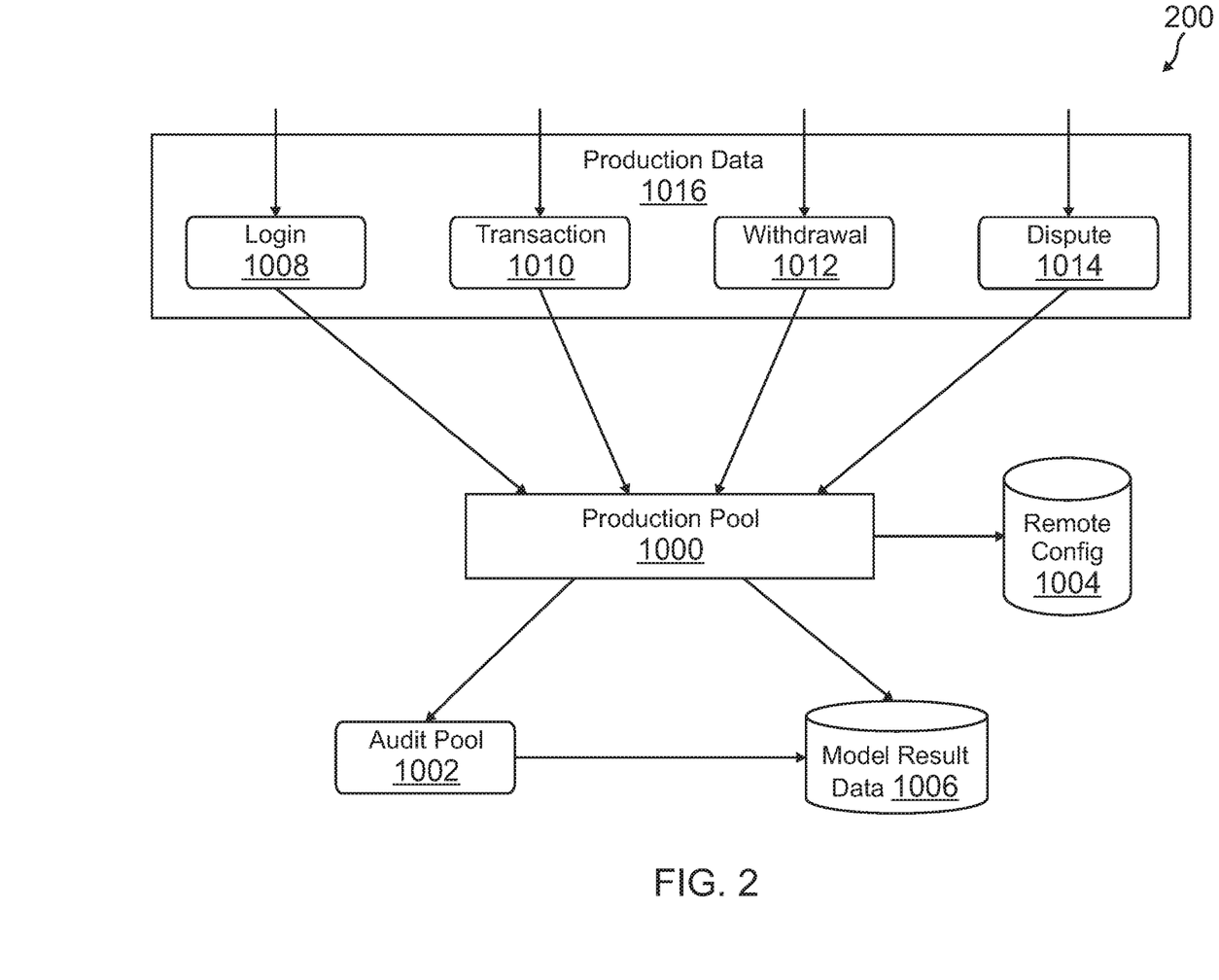
FIG. 2 is an exemplary block diagram of an audit computing environment shown separately from a production computing environment in order to perform live testing of risk models, according to an embodiment.

FIG. 2 is an exemplary block diagram 200 of an audit computing environment shown separately from a production computing environment in order to perform live testing of risk models, according to an embodiment. Diagram 200 of FIG. 2 includes an internal architecture of different data sources, operations, and computing environments of a service provider, such as service provider server 120, that may be used for testing and implementing different decision-making models including risk models. In this regard, the service provider may provide the architecture in diagram 200 for use in testing risk models to determine risk assessment and analysis performance, as well as execution times for risk assessment and analysis.

In this regard, in diagram 200, a production pool 1000 corresponds to a set of machines that host a production environment, such as production environment 130 of service provider server 120 in system 100. The production environment may be used to provide a computing environment having the computing products and services provided by production pool 1000. In this regard, decisions are adjudicated in the production environment using live risk models or other decision-making models. Further, production pool 1000 receives data traffic for use in the production environment, which may then be forwarded and provided to an audit pool 1002 based on a remote configuration 1004. Note that the term "production" includes real world data services, e.g., Audit pool 1002 may similarly correspond to a set of machines; however, audit pool 1002 may be maintained separated and/or segregated from production pool 1000. Audit pool 1002 is maintained separately as the machines of audit pool 1002 do not participate in the adjudication of data based on analysis by the risk models. For example, audit pool 1002 may not be configured to login a device and user to an account based on a risk analysis using one or more risk rules, perform electronic transaction processing, allow deposit or withdrawal of funds, adjudicate a dispute, or otherwise perform an action based on the results of one or more risk models in a risk analysis system. Thus, audit pool 1002 may receive at least a subset of the calls and production data from production pool 1000.

In this regard, audit pool 1002 may receive one or more risk models for testing in a corresponding audit computing environment. When testing the risk models, such as to determine a risk assessment scoring performance of the model or an execution time of the model with certain data, remote configuration 1004 may be used to direct production data traffic to audit pool 1002 for further analysis. Remote configuration 1004 may correspond to an engine and/or operation to allow configuring and scheduling of production data and traffic that is provided to audit pool 1002 for use in testing risk models. This may also include schedule of specific jobs and/or data traffic associated with timeout errors and execution time detection, as discussed further in reference to FIG. 3. Further, remote configuration 1004 may be used to test different types of production data and traffic. For example, a data scientist or developer may specify that data from a particular domain, software product or service, application, or the like be provided for testing the risk model. This may be done to test the risk model in the most likely environment and/or product for implementation of the risk model.

For example, remote configuration 1004 may be used to provide a portion or percentage of data traffic in the form of data processing transactions to audit pool 1002 for use with risk models. The risk models in audit pool 1002 may correspond to risk models for testing and/or debugging using the production data traffic. A new risk model, an updated version of a risk model, or a recently debugged risk model may be added to audit pool 1002 for testing using production data traffic in order to determine performance of the risk model and/or execution times for data processing. In this regard, audit pool 1002 may process the production data traffic using the risk model(s) loaded to audit pool 1002, which may result in risk scores, values, or other outputs from the risk assessment provided by the risk model(s). Thus, audit pool 1002 may receive production data 1016 processed by production pool 1000. For example, production data 1016 may come in the form of data processing transactions for login 1008, transaction 1010, withdrawal 1012, dispute 1014, or another data source from the service provider's operations, application, or domain that is processing data transactions.

In this regard, production data 1016 for login 1008 may correspond to login requests, as well as other authentication attempts and authentication processes (e.g., password reset, failed login timeout or lockout, etc.). Production data 1016 for transaction 1010 may correspond to electronic transaction processing requests, such as payments to merchants. Production data 1016 for withdrawal 1012 may correspond to withdrawal requests or other transfers of funds between different accounts, which may also correspond to a domain that includes data processing transactions for transfers and/or deposits. Production data 1016 for dispute 1014 may correspond to dispute requests and adjudications, such as those regarding transaction processing disputes, account disputes, and the like. Additionally, other data sources for different data processing transactions by the service provider may also provide production data 1016 to production pool 100.

Once data traffic is processed by production pool 1000 and/or audit pool 1002, risk scores and other risk assessment results may be determined for storage and comparison. These risk scores may be logged by a model result database 1006, including logging of multiple risk scores from different data processing transactions for one or more specific risk models, in a processing log or history for the risk model, such as a risk score log. The data processing transactions provided to audit pool 1002 from one or more of login 1008, transaction 1010, withdrawal 1012, dispute 1014, or another data source may each be specifically identified using a join key or other correlation identifier that allows for identification of the data processing transactions across the service provider. Since the data processing transactions are similarly processed by production pool 1000, the results from processing the transactions by the risk models in production pool 1000 and audit pool 1002 may be compared using the join key when accessing, from model result data 1006, resulting risk scores and risk assessments by production and/or test risk models.

When comparing results, the performance of the new or updated model in audit pool 1002 may be compared to a corresponding risk model in production pool 1000, which allows for determination of whether the model is detecting more or less fraud. This may also be domain specific for the particular data processing transactions' source and may include a catch rate of fraud from the particular model. Thereafter, when comparing risk assessment performance by the same or similar model, an analysis of the catch rate by the model as compared to the catch rate of the production risk model may be used to determine whether a risk model is to be promoted to production pool 1000 and used in the production environment, such as during a next system update. Additionally, processing the data processing transactions by the risk model using audit pool 1002 may also be used to detect execution times and risk models causing times, for example, using a request replay service shown in FIG. 3.

Further, audit pool 1002 may also be used to determine variances or standard deviations in execution times of different models. However, in other embodiments, production pool 1000 may also or instead be used to determine the standard deviations or other variations. For example, an average data processing and execution time (e.g., mean, median, mode, or other calculation) for processing data transactions by risk models may be monitored in production pool 1000 and/or audit pool 1002. When a fraudster requests fraudulent data processing that causes a timeout in a live risk analysis system, the execution time for this request may cause a large increase or spike. Thus, by determining the standard deviation or other variation in processing time from the average time, each model may be monitored to determine if the execution time of that model for a particular data processing transaction exceeds this variation.

If a model is detected as exceeding this variation in execution time, the model may be flagged for review (e.g. logged as exceeding the variation along with accompanying information and/or an alert sent to one or more system administrator personnel, etc.), as well as the data processing transaction. The flagged data processing transaction may therefore correspond to a fraudulent data processing transaction or other data processing request that causes an error, which may be processed as described in FIG. 3. The variation may correspond to the variation in average execution time, which may correspond to the average execution time for the risk analysis system or may be model specific, such as the average execution time of each individual model. Thus, a threshold based on 1, 2, 2.5, or some other number of standard deviations in execution time, or other variation calculation, may be implemented to detect those data processing transactions and risk models causing timeouts. Further, the threshold may also be implemented so that if the risk model exceeds the threshold, the risk model may be removed for the risk analysis calculation and assessment for the data processing transaction by the risk analysis system in order to prevent timeout. Removal of a particular risk model and variable calculation may allow for the risk analysis system to provide a partial risk assessment for the data processing transaction as a fallback mechanism, where the risk analysis system may be trained and setup to provide missing values and variables when risk models fail or are removed for risk analysis.

Figure 3:
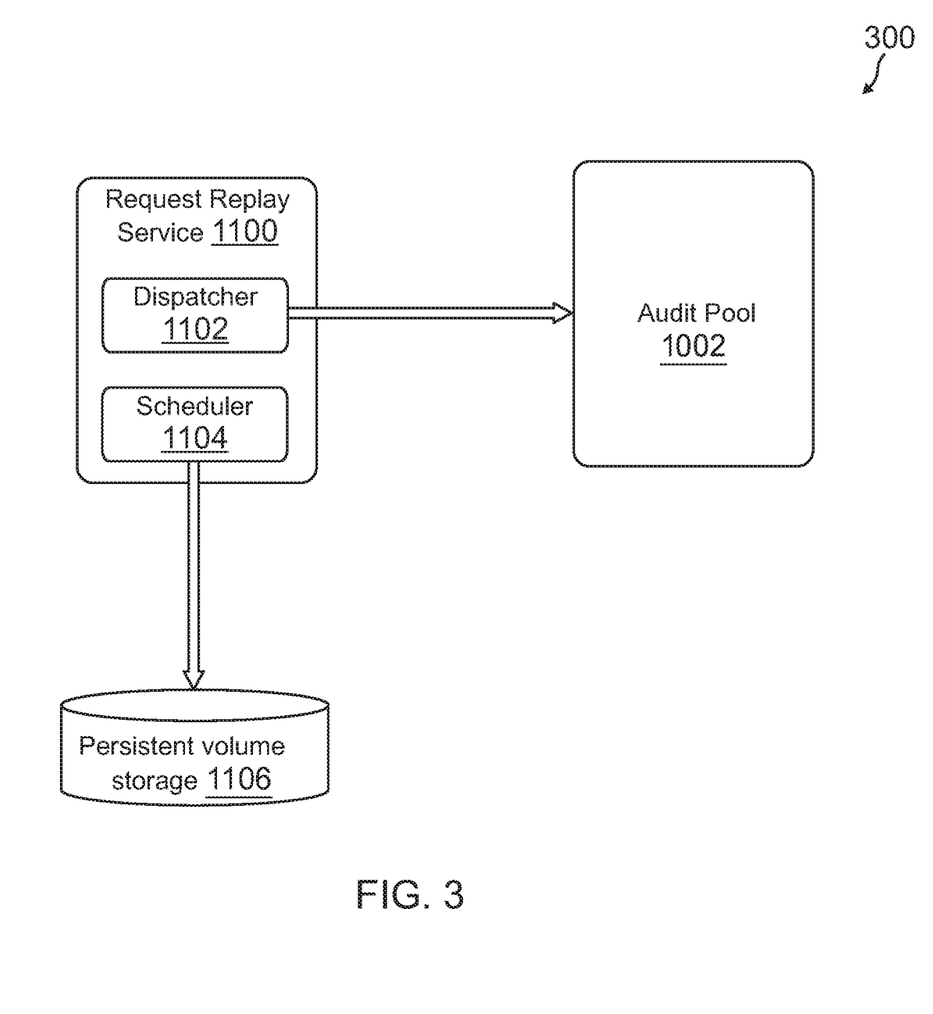
FIG. 3 is an exemplary block diagram of a replay request service for data processing transactions to determine timeouts of risk analysis models, according to an embodiment.

FIG. 3 is an exemplary block diagram 300 of a replay request service for data processing transactions to determine timeouts of risk analysis models, according to an embodiment. Diagram 300 includes an internal architecture of different data sources, operations, and computing environments of a service provider, such as service provider server 120, that may be used for detecting data processing transactions and/or risk models that may be causing timeouts and/or processing errors. This may include determining the variations or standard deviation in standard processing times that may be implemented in a production computing environment to flag risk models and data processing transactions. In this regard, the service provider may provide the architecture in diagram 300 for use in testing risk models to determine execution times for risk assessment and analysis by audit pool 1002, as discussed in diagram 200 of FIG. 2.

For example, a request replay service 1100 may be used to find execution times and processing errors for risk models that may be exploitable by bad actors using fraudulent or malicious data processing transactions. However, in the case of attacks caused by bad actors, the application programming interface (API) calls and other network data traffic may only make up a small subset of the overall data traffic in the production environment, such as a hundred or few hundred of 45 million daily calls. Further, a risk analysis system may have thousands, or tens of thousands, of variables determined by the different models within the system, which may make detecting the particular model encountering an error difficult. Thus, request replay service 1100 may be used to replay data processing requests and fraudulent transactions through a risk analysis system with live production traffic in a system without affecting a production environment. This may be done in an audit computing environment, for example, hosted by audit pool 1002.

In this regard, request replay service 1100 may receive a fraudulent data processing request and transaction, as well as a timeout value or execution time of the fraudulent transaction. The value or time may correspond to the amount of time causing the timeout, such as the maximum execution time threshold of the risk analysis system or the detected execution time of the fraudulent data processing transaction causing the timeout. This data may be provided by persistent volume storage 1106, which stores requests for testing a risk analysis system and corresponding models to detect one or more models causing an execution timeout. Persistent volume storage 1106 may include testing requests with metadata for the requests, including a number of times a request to test a risk analysis system should be replayed using production data traffic, a delay between consecutive requests (e.g., 10 seconds, 1 minute, which may be used to stagger processing times to process different data and analyze the data), whether requests should be executed in parallel or sequentially, and/or other request metadata that affects the execution of a request to test a risk analysis system using fraudulent production data traffic from a production computing environment.

Thereafter, scheduler 1104 of request replay service 1100 pulls or receives the request(s) and requests metadata for testing one or more risk models of a risk analysis system from persistent volume storage 1106. Scheduler 1104 may pool persistent volume storage 1106 for new or updated requests and may then invoke dispatcher 1102 of request replay service 1100 in order to send the request to test the risk analysis system and model based on fraudulent data processing transactions. The fraudulent data processing transactions may correspond to those data processing requests that cause a timeout and/or execution error in execution times of the risk models. Dispatcher 1102 therefore requests that audit pool 1002 processes the requests based on the request metadata and fraudulent data processing transactions. Audit pool 1002 therefore receives the request and the production data traffic to be analyzed, which corresponds to either fraudulent data and/or other data causing execution timeouts. Audit pool 1002 may therefore include one or more risk models for testing to determine execution time(s) for the risk model(s). When the request and metadata is passed by dispatcher 1102 to audit pool 1002, audit pool 1002 may receive all or a portion of fraudulent production data traffic from a production computing environment (e.g., the one hosted by production pool 1000 in diagram 200). Similar to FIG. 2, as data processing transactions are passed to audit pool 1002, the data processing transactions may be identified using join keys or other unique identifiers.

Thereafter, audit pool 1002 may process the requests using the risk analysis system and models in order to determine which risk model is causing the timeout. For example, audit pool 1002 may determine execution times of each of the risk models and may compare those execution times to the execution time of the fraudulent data processing transaction causing the timeout. This may include determining which data processing transactions cause the timeout of the particular model, the execution times of each model based on different data processing transactions, and the execution time of each model based on the fraudulent data processing transaction. Thereafter, when the risk model having the execution time that is the same or similar to the execution time of the fraudulent data processing transaction is identifier, the risk model may be moved to a local or offline computing environment in order to be debugged.

Figure 4A:
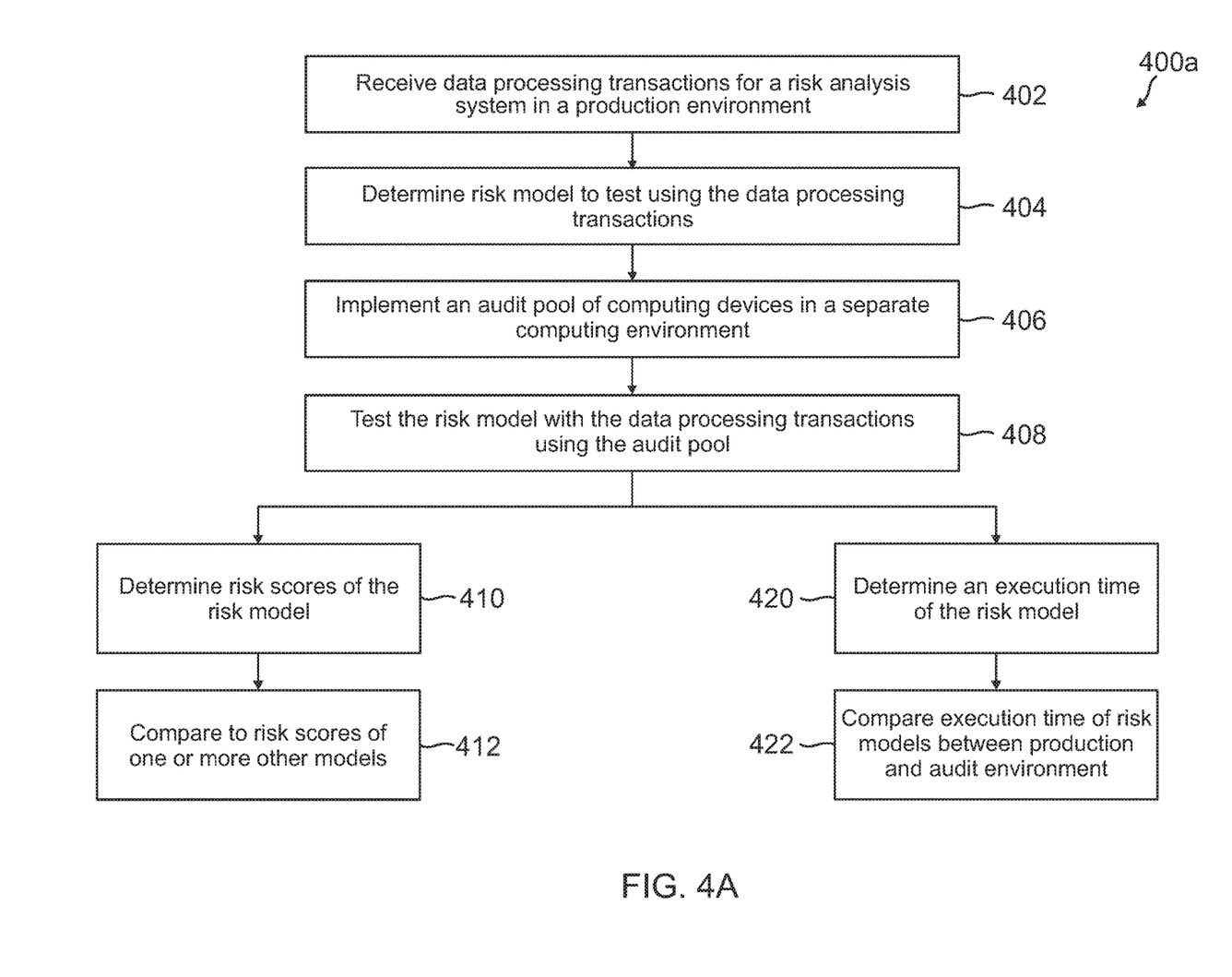
FIG. 4A is a flowchart for analyzing risk models using live data processing transactions, according to an embodiment.

FIG. 4A is a flowchart 400a for analyzing risk models using live data processing transactions, according to an embodiment. Note that one or more steps, processes, and methods described herein of flowchart 400a may be omitted, performed in a different sequence, or combined as desired or appropriate. In various embodiments, one or more elements of flowchart 400a in FIG. 4A may be performed by service provider server 120 or another computing system.

At step 402 of flowchart 400a, data processing transactions for a risk analysis system in a production environment are received. This may be received in a production computing environment of a service provider and may correspond to active data submitted by one or more users for processing by the software products and services of the service provider. In this regard, the production environment utilizes a risk analysis system having one or more risk models configured to determine a risk score and assessment of the data processing transactions. These risk models may correspond to intelligent and/or decision-making models utilized to provide a risk output that is utilized in the production environment to take an action, such as approving or declining a certain processing action. Additionally, the data processing transactions may correspond to fraudulent data processing transactions identified as causing timeouts in order to determine risk models affected by the fraudulent data processing transactions.

A risk model to test using the data processing transactions is determined, at step 404. The risk model may correspond to one of the risk models from the risk analysis system and may correspond to more than one risk model including all of the risk models of the risk analysis system. However, in other embodiments, the risk model may correspond to a new or updated version of a risk model for promotion and implementation in the risk analysis system of the production environment. At step 406, an audit pool of computing devices in a separate computing environment is identified. The audit pool may host an audit environment corresponding to a computing environment that is separate from the production environment but mirrors and mimics the behavior of the production environment so that the set of machines in this environment processes real-time or live production data traffic. For example, the audit environment is not offline and reads data from production databases but may or may not write data to production databases. Thus, the audit environment receives and processes live production data but does not perform adjudication operations to implement decisions of the risk models and systems within the audit computing environment.

At step 408, the risk model is tested with the data processing transactions using the audit pool. Testing of the risk model may correspond to processing the data processing transactions from the live production data traffic. For example, the risk model may be tested to determine a performance of the risk model under the conditions and stress of the production environment, however, using the audit pool in the audit environment without affecting the production environment and causing adjudication of risk analysis decisions and results. In some embodiments, the data processing transactions may correspond to all or a part of the production data traffic incoming from various data sources. However, the data processing transactions may also be domain or source specific, for example, to test the risk model with a specific set of data (e.g., login or authentication data as opposed to electronic transaction processing data). A remote configuration service or operation may be provided in order to specify an amount or percentage of production data traffic to test the model, and/or limit the particular data traffic to a specific domain or source.

When tested using production data traffic for analysis of risk model performance, at step 410, risk scores of the risk model are determined. The risk scores may correspond to risk analysis results or outputs of the model when performing a risk assessment based on the model's training, such as providing a classification, value, or other quantification of risk of each of the data processing transactions. The risk scores may be aggregated into a risk score log or other history that allows analysis of the risk scores determined by a risk model, as well as viewing a representation of catch rate for fraud using the risk models. Moreover, the risk scores and corresponding data processing transactions may each be identified using a join key or other unique identifier that lets comparison of the risk scores, catch rates, and other outputs of the risk model in the audit environment to risk models in the production environment that process the same data processing transactions. Thus, at step 412, the risk scores from the risk model are compared to the risk scores of one or more other models, such as the risk models in the production environment. This may include comparing different risk models' output risk scores based on the join key so that catch rates may be compared for the same or similar data processing transactions.

In other embodiments at step 408, the risk model is tested using one or more fraudulent data processing transactions based on a replay request to identify risk models incurring timeouts that prevent the risk model from properly processing data. These fraudulent data processing transactions further cause timeouts in the risk analysis system, which may require resolution to prevent exploitation by bad actors. Thus, a scheduler of a replay request service may receive requests and request metadata from a persistent volume storage. Thereafter, the request replay service may execute a dispatcher to provide the fraudulent data processing requests with request metadata for scheduling to the audit pool for processing in the audit environment.

Thereafter, at step 420, an execution time of the risk model is determined. The execution time may correspond to an amount of time required to process the fraudulent data processing transaction by the risk model. Further, the fraudulent data processing transaction may be associated with an execution time that caused the timeout with the risk analysis system and/or was identified with the fraudulent data and processing request. Thereafter, the timeout execution times occurring in the production environment are compared to those in the audit computing environment, at step 422. This allows for determination of whether the risk model is causing the timeout in the production environment. If so, the risk model may be moved to a local or offline environment for debugging to prevent exploitation.

Figure 4B:
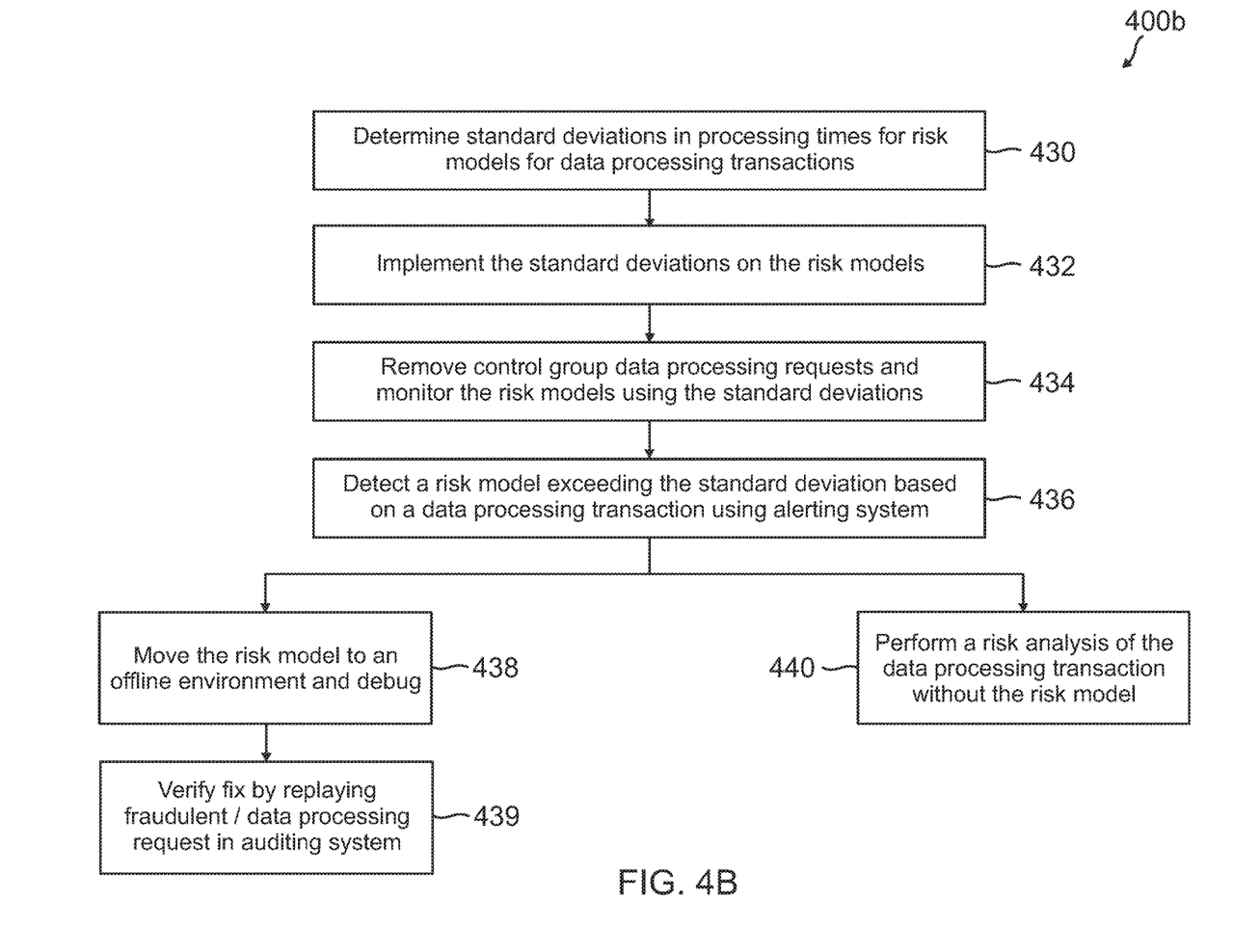
FIG. 4B is a flowchart for determining risk models that cause timeouts in risk analysis systems, according to an embodiment.

FIG. 4B is a flowchart 400b for determining risk models that cause timeouts in risk analysis systems, according to an embodiment. Note that one or more steps, processes, and methods described herein of flowchart 400b may be omitted, performed in a different sequence, or combined as desired or appropriate. In various embodiments, one or more elements of flowchart 400b in FIG. 4B may be performed by service provider server 120 or another computing system.

At step 430 of flowchart 400b, standard deviations in processing times for risk models in a production environment for data processing transactions are determined. These standard deviations or other variations in an average execution time for the models may be determined by monitoring and examining the execution times and average calculation for the execution times of the risk analysis system and/or individual risk models. A standard deviation may then be determined from the monitored execution times. In some embodiments, the average execution times may be determined from monitoring the processing of data processing transactions and other data traffic in the production environment. However, in other embodiments, the execution times may be monitored by utilizing one or more risk models with production data traffic in an audit computing environment separate from the production environment.

Using the standard deviations, at step 432, the standard deviations are implemented on the risk models of a risk analysis system. For example, each risk model may be associated with a particular standard deviation in execution time, which may correspond to the average execution time of the particular risk model or of the risk assessment system in general. Additionally, a factor of the standard deviation may also be implemented, such as one or two standard deviations, which affect the establishment of a threshold execution time for each risk model. Additionally, the standard deviations may be adjusted in real-time or periodically to provide a dynamic timeout threshold and standard deviation calculation based on the changes in average execution time by risk models. Thus, the deviations in average compute time of the risk models may be cached and used to dynamically implement the standard deviations on the risk models. In various embodiments, the standard deviation calculation may be weekly, but other time periods may also be used.

At step 434, the risk models are monitored using the standard deviations, for example, by monitoring each risk models' execution times when processing data traffic in a production environment. The data traffic includes production data processing transactions requested by users, but may include fraudulent requests that attempt to cause errors or otherwise attack a risk analysis system using risk models for decision-making. Thus, the risk models are monitored to ensure that they do not exceed an execution time that would otherwise cause a timeout of the risk model in the risk analysis system.

At step 436, a risk model exceeding the threshold for the standard deviation in execution time is detected based on a data processing transaction. The risk model may exceed the threshold set for the standard deviation if the risk model is processing a data processing transaction that may be fraudulent or include data that causes an error in the risk model. Thus, the risk model may be flagged, as well as the corresponding data processing transaction that caused the risk model to exceed the threshold standard deviation in execution time. Based on this flagging, step 438 and/or step 440 may be executed with the flagged risk model and data processing transaction. At step 438, the risk model may be moved to an offline, local, or other separate computing environment where the risk model may be debugged and reviewed for errors. This may include removing the risk model from the risk analysis system and replacing the risk model with another risk model or a condition until the risk model may be updated. At step 440, a risk analysis of the data processing transaction may be performed without the risk model that is exceeding the standard deviation threshold in execution time. This may allow the risk analysis system to further perform a risk analysis, and therefore determine whether the data processing transaction is fraudulent, while not causing a timeout that may affect risk assessment performance. Additionally, at step 439, the any fixes placed on the risk model may be verified by replaying the fraudulent data against such models within the production or audit environment.

Figure 5:
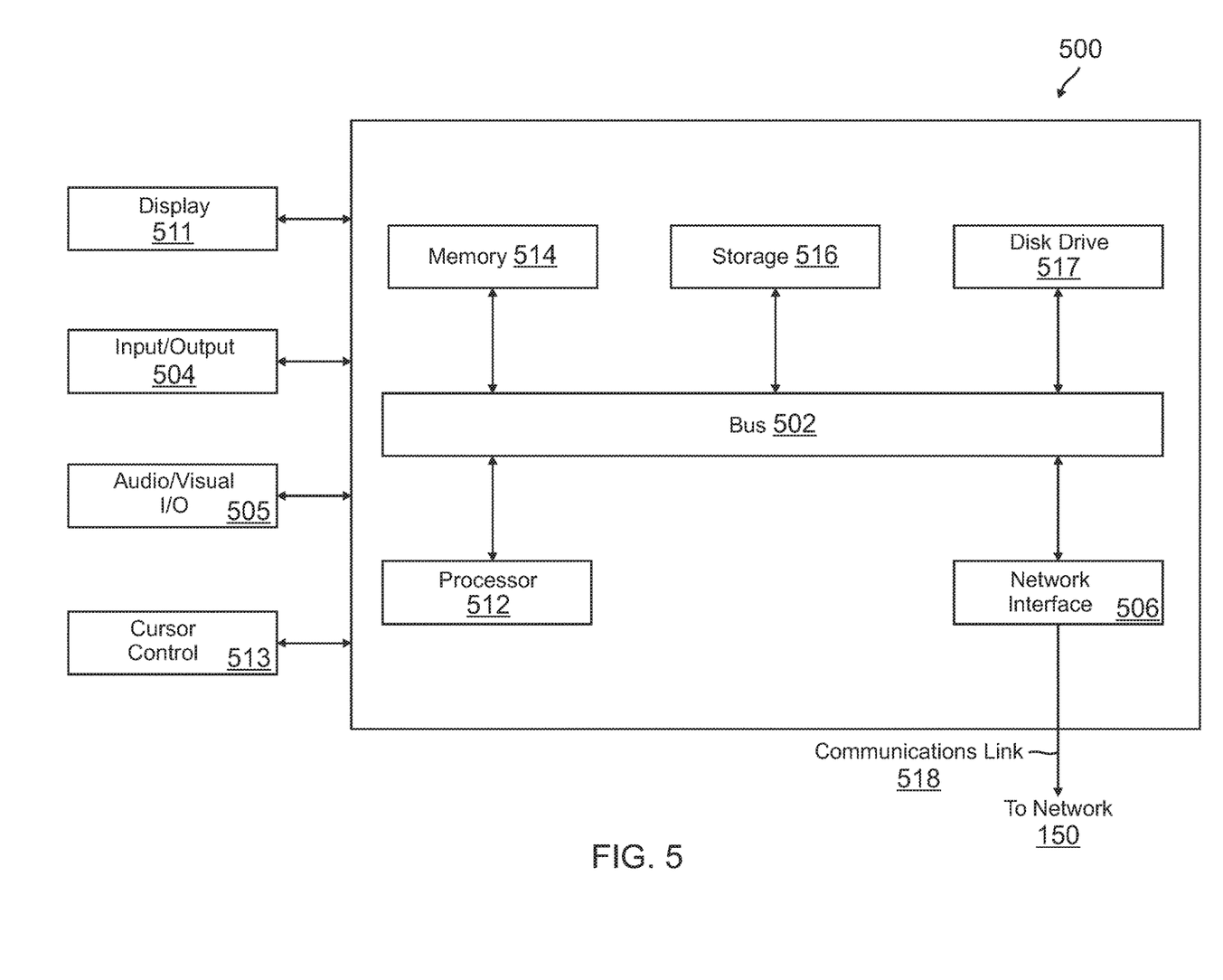
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
  a non-transitory memory; and
  one or more hardware processors coupled to the non-transitory memory and configured to read instructions from the non-transitory memory to cause the system to perform operations comprising:
    accessing a first risk model for analysis via an audit computing environment separate from a production computing environment, wherein the audit computing environment comprises a first pool of computing devices and the production computing environment comprising a second pool of computing devices, and wherein the audit computing environment is configured to receive at least a portion of data traffic processed by the second pool of computing device in the production computing environment;
    accessing a plurality of first data processing transactions from the at least the portion of the data traffic, wherein the plurality of first data processing transactions are associated with data fingerprints identifying the plurality of first data processing transactions with the system;
    testing the first risk model with the plurality of first data processing transactions using the first pool of computing devices;
    determining a first result of the testing of the first risk model with the plurality of first data processing transactions, wherein the first result comprises a first risk score generated from the testing the first risk model with the plurality of first data processing transactions; and
    accessing, using the data fingerprints, a second result comprising a second risk score generated from processing the plurality of first data processing transactions.

2. The system of claim 1, wherein the first risk model comprises an updated test version of a production version of a second risk model, wherein the production version is utilized in the production computing environment, and wherein the second result is based on the second risk model, and wherein the operations further comprise:
  comparing the first result to the second result.

3. The system of claim 2, wherein the comparing the first result to the second result further comprises determining whether the first risk model detects an increased amount of fraud over the second risk model based on the first result and the second result.

4. The system of claim 2, wherein the audit computing environment is separate from the production computing environment based on the first pool of computing devices operable to process the plurality of first data processing transactions separately from the second pool of computing devices.

5. The system of claim 1, wherein prior to the determining the first risk model, the operations further comprise:
  receiving from a remote configuration operation, a selection of a domain for the data traffic, wherein the domain comprises a subset of the data traffic for a service provided by the system; and
  determining the plurality of first data processing transactions based on the selection of the domain.

6. The system of claim 1, wherein the data traffic comprises production data processing transaction processed by the second pool of computing devices in the production computing environment on behalf of users of the system, and wherein the production data processing transaction comprises at least one of an account login, an authentication attempt, an electronic transaction processing request, a user verification, a financial instrument verification, or a service enrollment request.

7. The system of claim 1, wherein the operations further comprise:
  testing the first risk model with a plurality of second data processing transactions using the first pool of computing devices;
  determining a third result of the testing of the first risk model with the plurality of second data processing transactions, wherein the second result comprises a third risk score generated from the testing the first risk model with the plurality of second data processing transactions; and
  generating a risk score log based on the first result and the second result, wherein the risk score log comprises a performance comparison of the first risk model based on the plurality of first data processing transactions and the plurality of second data processing transactions.

8. The system of claim 7, wherein the risk score log further comprises a catch rate for fraud detection based on the first result and the second result.

9. The system of claim 1, wherein the audit computing environment comprises a plurality of risk models to determine risk scores from the at least the portion of the data traffic, and wherein the audit computing environment does not include an adjudication operation to execute processing decisions from the risk scores for the at least the portion of the data traffic.

10. The system of claim 1, wherein the operations further comprise:
based on at least one of the first result or the second result, moving the first risk model from the production computing environment to an offline computing environment.

11. A method comprising:
receiving from a remote configuration operation, a selection of a domain for data traffic, wherein the domain comprises a subset of the data traffic for a computing service;
determining a plurality of first data processing transactions based on the selection of the domain;
accessing a first risk model via an audit computing environment separate from a production computing environment, wherein the audit computing environment comprises a first pool of computing devices and the production computing environment comprises a second pool of computing devices, and wherein the audit computing environment is configured to receive the subset of the data traffic processed by the second pool of computing device in the production computing environment;
accessing the plurality of first data processing transactions from the at least the subset of the data traffic;
testing the first risk model with the plurality of first data processing transactions using the first pool of computing devices; and
determining a first result of the testing of the first risk model with the plurality of first data processing transactions, wherein the first result comprises a first risk score generated from the testing the first risk model with the plurality of first data processing transactions.

12. The method of claim 11, wherein the first risk model comprises an updated test version of a production version of a second risk model, wherein the production version is utilized in the production computing environment, and wherein the method further comprises:
determining a second result comprising a second risk score generated from processing the plurality of first data processing transactions using the second risk model; and
comparing the first result to the second result.

13. The method of claim 12, wherein the plurality of first data processing transactions comprises a data fingerprint identifying the plurality of first data processing transactions, and wherein the determining the second result comprises accessing the second result using the data fingerprint.

14. The method of claim 12, wherein the comparing the first result to the second result further comprises determining whether the first risk model detects an increased amount of fraud over the second risk model based on the first result and the second result.

15. The method of claim 12, wherein the audit computing environment is separate from the production computing environment based on the first pool of computing devices operable to process the plurality of first data processing transactions separately from the second pool of computing devices.

16. The method of claim 11, wherein the data traffic comprises production data processing transaction processed by the second pool of computing devices in the production computing environment on behalf of users of the production computing environment, and wherein the production data processing transaction comprises at least one of an account login, an authentication attempt, an electronic transaction processing request, a user verification, a financial instrument verification, or a service enrollment request.

17. The method of claim 11, further comprising:
testing the first risk model with a plurality of second data processing transactions using the first pool of computing devices;
determining a second result of the testing of the first risk model with the plurality of second data processing transactions, wherein the second result comprises a second risk score generated from the testing the first risk model with the plurality of second data processing transactions; and
generating a risk score log based on the first result and the second result, wherein the risk score log comprises a performance comparison of the first risk model based on the plurality of first data processing transactions and the plurality of second data processing transactions.

18. The method of claim 17, wherein the risk score log further comprises a catch rate for fraud detection based on the first result and the second result.

19. A non-transitory machine-readable medium having stored thereon machine-readable instructions executable to cause a machine to perform operations comprising:
accessing a first risk model via an audit computing environment separate from a production computing environment, wherein the audit computing environment comprises a first pool of computing devices and the production computing environment comprises a second pool of computing devices, and wherein the audit computing environment is configured to receive at least a portion of data traffic processed by the second pool of computing device in the production computing environment;
accessing a plurality of first data processing transactions from the at least the portion of the data traffic;
testing the first risk model with the plurality of first data processing transactions using the first pool of computing devices;
determining a first result of the testing of the first risk model with the plurality of first data processing transactions, wherein the first result comprises a first risk score generated from the testing the first risk model with the plurality of first data processing transactions;
testing the first risk model with a plurality of second data processing transactions using the first pool of computing devices;
determining a second result of the testing of the first risk model with the plurality of second data processing transactions, wherein the second result comprises a second risk score generated from the testing the first risk model with the plurality of second data processing transactions; and
generating a risk score log based on the first result and the second result, wherein the risk score log comprises a performance comparison of the first risk model based on the plurality of first data processing transactions and the plurality of second data processing transactions.

20. The non-transitory machine-readable medium of claim 19, wherein the risk score log further comprises a catch rate for fraud detection based on the first result and the second result.

* * * * *